United States Patent
Mandalia et al.

(10) Patent No.: US 9,288,121 B2
(45) Date of Patent: Mar. 15, 2016

(54) SYSTEM AND METHOD FOR ASSOCIATING ONLINE CONTENT TO A SECOND INDEXED CONTENT

(71) Applicant: Google Technology Holdings LLC, Mountain View, CA (US)

(72) Inventors: Hiren M. Mandalia, Elk Grove Village, IL (US); Santosh S. Basapur, Hanover Park, IL (US); Shirley A. Chaysinh, Grayslake, IL (US); Young S. Lee, Palatine, IL (US); Narayanan Venkitaraman, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 482 days.

(21) Appl. No.: 13/633,943

(22) Filed: Oct. 3, 2012

(65) Prior Publication Data

US 2014/0095608 A1 Apr. 3, 2014

(51) Int. Cl.
*H04L 12/24* (2006.01)
*G06F 17/30* (2006.01)

(52) U.S. Cl.
CPC ........ *H04L 41/509* (2013.01); *G06F 17/30038* (2013.01); *G06F 17/30855* (2013.01); *H04L 41/5083* (2013.01)

(58) Field of Classification Search
CPC . G06F 17/24; G06F 17/241; G06F 17/30038; G06F 17/30855; G06F 17/3089; G06F 17/30905; H04L 2209/60; H04L 41/5083; H04L 41/509
See application file for complete search history.

(56) References Cited

U.S. PATENT DOCUMENTS

| | | | |
|---|---|---|---|
| 8,121,342 B2 | 2/2012 | Davis et al. | |
| 8,131,132 B2 | 3/2012 | Klappert | |
| 8,135,669 B2 | 3/2012 | Olstad et al. | |
| 8,151,182 B2 * | 4/2012 | Datar et al. | 715/230 |
| 2006/0224583 A1 * | 10/2006 | Fikes et al. | 707/6 |
| 2008/0201201 A1 * | 8/2008 | Pousti et al. | 705/10 |
| 2010/0169786 A1 * | 7/2010 | O'Brien et al. | 715/738 |
| 2010/0306249 A1 * | 12/2010 | Hill et al. | 707/769 |
| 2012/0246685 A1 | 9/2012 | Fink et al. | |
| 2014/0040258 A1 * | 2/2014 | Schwartz et al. | 707/736 |

OTHER PUBLICATIONS

Pablo Cesar et al.: "Enhancing social sharing of videos", Proceeding of the 16th ACM Internation Conference on Multimedia, MM '08, Jan. 1, 2008, All Pages.*

OTHER PUBLICATIONS

Patent Cooperation Treaty, International Search Report and Written Opinion of the International Searching Authority for International Application No. PCT/US2013/060797, Nov. 7, 2013, 7 pages.

* cited by examiner

*Primary Examiner* — Michael C Lai
(74) *Attorney, Agent, or Firm* — Fenwick & West LLP

(57) ABSTRACT

A method includes receiving content-association input, including identification of accessed first content and an index position of a second content, and associating the accessed first content with the second content at the index position. Users accessing the second content are provided information related to the first content in response to the access of the second content. The information provided may be a link to the first content, a description of the first content, a portion of the first content, or the entire first content. Another method includes providing a user interface within an application window while the application window displays a first content and providing a second window in response to selection input via the user interface. The second window displays an indexed second content. Input may be received via the second window to create an association of the first content with the second content at an index position.

14 Claims, 6 Drawing Sheets

SYSTEM AND METHOD FOR ASSOCIATING ONLINE CONTENT TO A SECOND INDEXED CONTENT

TECHNICAL FIELD

The present disclosure is related generally to social-media networks and, more particularly, to tagging content within a social-media framework.

BACKGROUND

Social media enable social network members to comment or "like" or "dislike" certain pieces of content such as articles and videos. Usually, a browser application window displays content, such as an article or video, and provides various button widgets each associated with a given social network. By selecting an appropriate one of these buttons, a user may "share" the article or video with other users who are members, or are logged in to, the respective social network. Other users may see an indication of how many times certain content has been "shared," e-mailed, "tweeted," etc., or may be able to view comments added to the content by other users.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
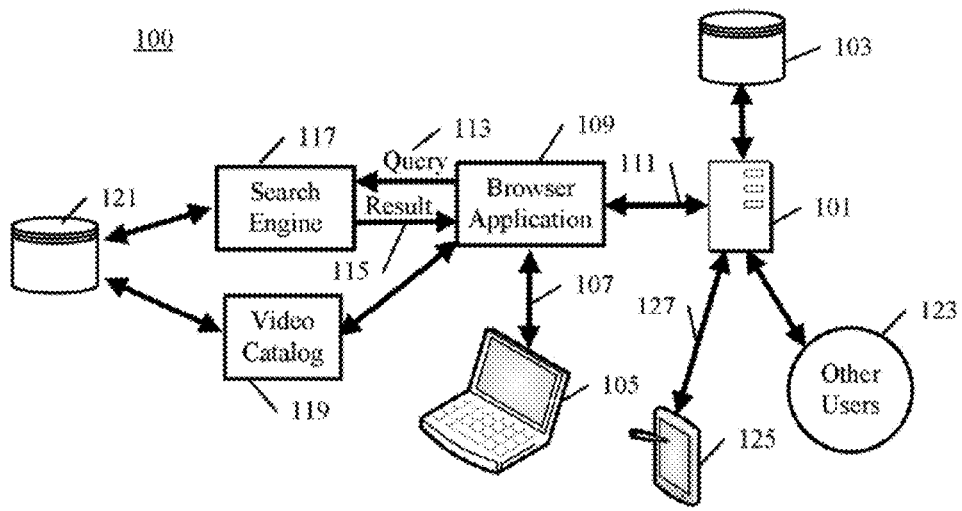
FIG. 1 is a diagram of network architecture in accordance with an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present disclosure provides a system and methods of operation that enable a user to "pin" a piece of content to a second indexed content, at a given index position. For example, a user may pin a Web article to a video at a specific time (i.e., an index position) in the video, or to a specific scene. When the same user, or another user, accesses the video and arrives at the specific index position (such as the appropriate time, scene, or frame), that user will be given access to, or information about, the pinned article. The embodiments provide, among other advantages, an enhancement to the informational value of indexed content such as video, audio, electronic books, or other forms of indexed content by enabling associations (i.e., pinning) of other interesting or useful information content at specific relevant index locations. Put another way, the various embodiments provide a new form of, or, a new way of creating, hypermedia that enable users to obtain supplementary materials in various formats related to indexed content. The embodiments also provide a new form of collecting and sharing that enables the content to be available along with the right context (access of an indexed content) and at the right time (at the index position) to a user.

One disclosed method includes receiving content-association input including identification of an accessed first content and an index position of a second content and associating the accessed first content with the second content at the index position of the second content in response to the content-association input. When a user subsequently accesses the second content, that user is provided with information related to the first content in response to access of the second content. The information provided is based on the association of the first content with the second content and may include a link to the first content, a description of the first content, a portion of the first content, or the entire first content.

A user may search for the second content using a search engine, for example, or the second content may be determined automatically. Automatic determination of the second content may include determining a list of suggested second-content choices and providing a most relevant choice from the list. In some embodiments, a user interface is provided with a selectable option to view the list of suggested second-content choices. The second content may then be displayed based on selection from the list of suggested second-content choices. The list of suggested second-content choices may also be based upon accessed content indicated in a user history.

In some embodiments a user interface may be provided on a first device while the first content is displayed on a second device. The user interface is operative to send the content-association input to a server. The indexed second content may be, but is not limited to, video. The video may have a time index or a frame index, where an index position corresponds to a time in the video or a frame in the video. Other indexing schemes may also be used.

Another disclosed method includes providing a user interface within an application window while the application window displays a first content. A second window is then provided in response to selection input via the user interface. The second window displays an indexed second content and enables entry of input for creating an association of the first content with the second content at an index position. When users subsequently access the second content, the users are provided with information related to the first content in response to access of the second content.

Index-information input may be received via the second window, with the index-information input indicating an index position of the indexed second content. An association input then creates the association of the first content to the indexed second content at the index position corresponding to the index-information input.

A search box may be provided in the second window, prior to displaying the indexed second content. Then the indexed second content may be displayed as one of the search results obtained based on search text entered into the search box. The second content may also be determined. This may include determining a list of suggested second-content choices and displaying a most relevant choice from the list of suggested second-content choices as the indexed second content. A selectable option to view the list of suggested second-content choices may be provided. The indexed second content displayed may be based on selection from the list of suggested second-content choices. The list of suggested second-content choices may also be based upon accessed content indicated in a user history.

The user interface within the application window may include, or may be, a selectable icon within the application window. The second window may be provided in response to selection input via the user interface and may display a thumbnail view of a video as the indexed second content. The index may be a time index, and the index position may be a point in time of the video. The second window provides a pop-up window or an additional frame of a browser application window where the browser application window is the application window.

A disclosed system includes at least one server hosting an application accessible by multiple users. The server is operative to receive the content-association input including identification of a first content and an index position of a second content, to create an association of the first content with the second content at the index position, and to provide information related to the first content, in response to access of the second content at the index position. The server is also operative to receive index-position input via a user interface on a remote device.

The system may include a content-suggestion server, operatively coupled to the server or integrated with the server. The content-suggestion server is operative to determine the second content in accordance with the various methods discussed briefly above.

The system may include a user-profile database operatively coupled to the content-suggestion server, where the content-suggestion server is further operative to determine the list of suggested second-content choices based on accessed content indicated in a user history stored in the user-profile database. The content-suggestion server may include a multimedia-analysis module and a video-asset-matching module operatively coupled to the multimedia-analysis module. The multimedia-analysis module is operative to analyze the first content being displayed on the remote device. The video-asset-matching module is operative to receive analysis of the first content, to access video metadata, scene metadata, and a user profile, and to provide the remote device with at least one suggested second content.

Turning now to the drawings, FIG. 1 illustrates an example network architecture 100 in accordance with an embodiment. As shown in FIG. 1, network architecture 100 includes an electronic device 105 which may be a laptop, PDA, tablet, other mobile communication device, television, or some other suitable electronic device. The electronic device 105 includes a media application such as, but not limited to, a browser application 109. In accordance with embodiments, the user of the electronic device 105 provides commands and inputs 107 to the browser application 109, and the browser application 109 interacts with a server 101 over an Internet connection 111. The server 101 of the various embodiments includes a pinned-content database 103 that contains metadata for associations made among content as described below in further detail. The server 101 may access the pinned-content database 103 and may provide information, such as, but not limited to, links or portions of pinned content that may be pinned to index positions of primary content when the primary content is accessed at the given index positions. The access may be by the same user or other users 123 who connect to the server 101 over a network such as the Internet.

For purposes of explanation the present disclosure uses terminology including "first content," "second content," "primary content," and "pinned content." This terminology is used only to facilitate understanding and explanation of the various embodiments and is not to be construed as limiting. As used herein a "primary" content (usually referred to herein as "second content") is an "indexed" content. That is, the primary content or second content has an indexing scheme such as time based, frame based, page based, etc., and that has a given granularity (for example, hours, minutes, seconds, etc.) where a position within that given granularity may be indicated as an "index position" by index information or index input that can be provided to the server 101 via an electronic device, for example, through a user interface. The "first content" may become a "pinned content" after association with a second content at an index position of the second content in accordance with the methods of operations disclosed and described herein in accordance with the various embodiments. An "accessed" first content as used herein refers to the first content being consumed, that is, viewed, by a user and which the user decides to "pin" to another second content (i.e., an "indexed" second content) by way of one of the various embodiments herein disclosed.

The browser application 109 may send queries 113 to a search engine 117 and obtain results 115 which are displayed by the browser application 109, as understood by those of ordinary skill. Additionally the browser application 109 may access a video catalog 119 which may provide access to a video database 121. Likewise the search engine 117 may provide results 115 to the browser application 109 by searching the contents of the video database 121.

The electronic device 105 may access some content such as, for example, an article, using the browser application 109. In accordance with embodiments, the server 101, which interacts with the browser application 109 over the Internet connection 111, may detect the article being accessed (i.e., the accessed first content) by the browser application 109. However, alternatively the user may provide input that indicates that the user wishes to pin the article to an indexed second content. In this example, the browser application 109 may send identification of the first content such as, but not limited to, a URL link, a title, metadata, or any other suitable identification that uniquely identifies the first content and enables retrieval of the first content by the server 101 or by other devices, i.e., other users 123. In some embodiments, the server 101 may send executable code over the Internet connection 111 to the browser application 109 to provide a user interface. The executable code for the user interface may be, for example, JavaScript or a Java applet, etc. In other embodiments, the user interface may be resident on the electronic device 105 and may be integrated with the browser application 109. The user interface enables the user of the electronic device 105 to make an association of content being viewed in the browser application 109 window to an indexed second content. That is, the user may pin a first content to a second content at an index position. One example is that the user may pin a Web article to a video at a scene or point in time (i.e., the "index position") of the video.

In one example embodiment, the server 101 may display a search box within the user interface such that the user may enter search text and obtain a result within the user interface. The search results may include a list of videos from the video catalog 119. If the user wishes to pin the article to a scene or specific location within the video, the user interface may allow the user to scroll to the appropriate frame or time within the video. The user interface may also enable a user to select a portion of a video frame image for pinning of the article. For example, the video frame image may be divided up into sections or may allow pinning to pixel areas within the image. The user may then provide content-association input to pin the article to the scene or time within the video (or to a location on the frame in embodiments having this granularity of indexing). In other words, the user makes an association of first content being viewed within the browser application 109 window to the second indexed content at an index position (time, frame, scene, etc.).

In another example embodiment, a user may have multiple devices such as a laptop 105 and a tablet 125. In this example, one device may view the first content, such as an article, while the other device provides a user interface for entry of content-association input that is provided to the server 101. For example, the electronic device 105 may be used to browse content on the Web. In some embodiments, the server 101 may detect the browsed content and send suggested second content items for pinning to the user's second electronic device 125. As mentioned, the electronic device 125 has a user interface that may be part of a resident application, i.e., resident on the electronic device 125, or, alternatively, an application provided by the server 101 to the electronic device 125. Examples of applications provided by the server 101 include a cloud-based application accessible by logging in to the cloud-based application service ("Software as a Service") or a Java applet or JavaScript pushed to the electronic device 125 as a client device. When the electronic device 125 acts in the role of "client," the server 101 may include context awareness of the user's multiple devices such as the electronic device 105 and the electronic device 125, so that the first content viewed on the electronic device 105 is used by the server 101 to provide second content suggestions or to allow the user to make associations in accordance with the embodiments. The devices may also share information about content being viewed, in some embodiments, via status-announcement messages sent in a peer-to-peer manner between the devices. In other alternative embodiments, content information may be queried using various interoperability protocols, for example, the "GetMediaInfo" command specified by DLNA (Digital Living Network Alliance) standards may be utilized. In other embodiments, an application on one of the devices may utilize audio or video signatures or watermarks to determine the first content on the other device and to obtain that information from the other device in a peer-to-peer manner.

The electronic device 105 may also include a first user interface, such as, but not limited to, a selectable icon or "button" that enables the user to initiate a second user interface or additional user interface features and capabilities on the electronic device 125. That is, the user may provide input that sends the server 101 identification information that identifies the first content being viewed on the electronic device 105 and that informs that server 101 that the user wishes to make an association with a second content. The server 101 may, in response, provide executable code (such as a Java applet or JavaScript or some other suitable executable code) to the electronic device 125 to provide a user interface. The user may then use the electronic device 125 to obtain second content, either by searching or by server suggestions and to provide content-association input to pin the first content viewed on the electronic device 105 with a second content viewed on the electronic device 125. The user may provide index input in various ways such as using a scroll bar, direct input of a numerical index indication, identification of a page, video frame, or any other suitable index input, etc., that conveys an index position of the second content to the server 101. The server 101 then creates an association of the first content with the second content at the index position based on the index input and content-association input.

The content-association input is entered by a user into the electronic device 105 (or into the electronic device 125) via a user interface and includes at least identification of the first content (i.e., the content to be pinned) and an index position of the second content. The server 101 may have a priori knowledge of the identity of the second content in the embodiments where the server 101 provides a suggested second content or displays second content in a user interface for the user based on search results. An example embodiment where second content is suggested to the user is described below.

Figure 2:
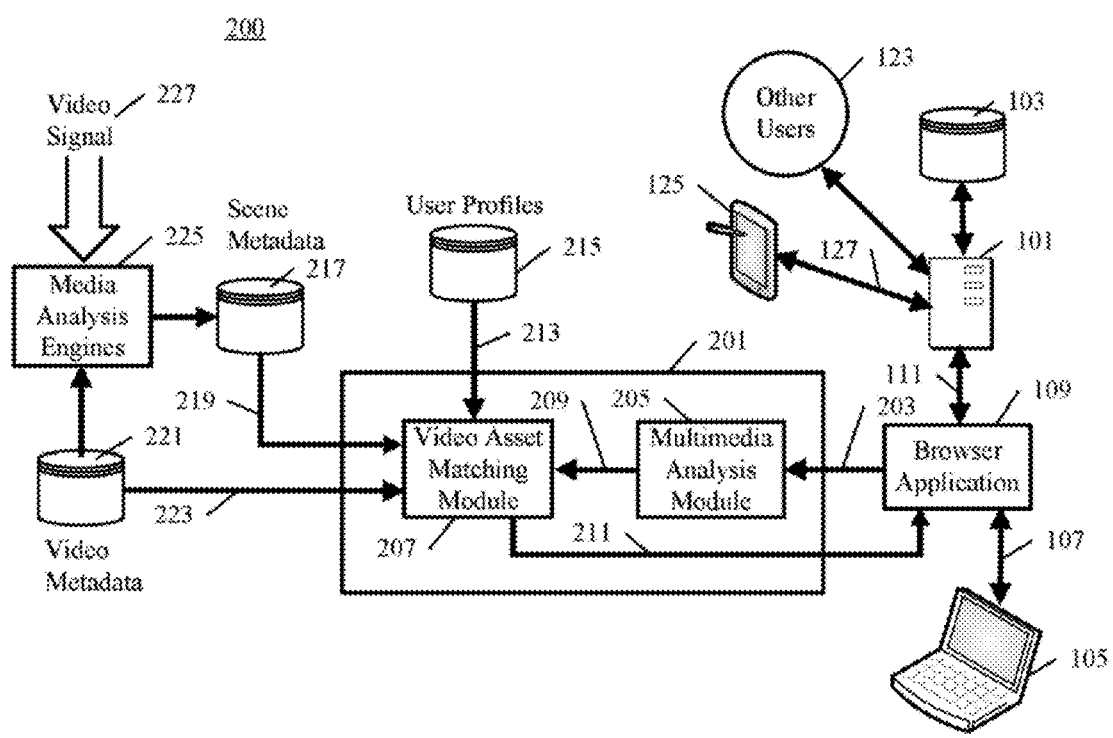
FIG. 2 is a diagram of a network architecture in accordance with another embodiment that includes a content-suggestion server.

FIG. 2 is a diagram of an example network architecture 200 in accordance with another embodiment. The network architecture 200 includes a content-suggestion server 201. The content-suggestion server 201 may be included, or integrated, with the server 101 in some embodiments. In this example, the browser application 109 includes a connection 203 to the content-suggestion server 201, a connection over a network such as the Internet. The content-suggestion server 201 may also access a user-profile database 215 over the Internet connection 213, a video-metadata database 221 via the Internet connection 223, and a scene-metadata database 217 via the Internet connection 219. The scene-metadata database 217 may be populated by various media-analysis engines 225 which receive video signals 227 and perform analytics or extract the scene metadata.

The content-suggestion server 201 may include a multimedia-analysis module 205 coupled via connection 209 to a video-asset-matching module 207. The video-asset-matching module 207 provides content suggestions 211 to the user interface of the browser application 109. The content suggestions may be a listing of one or more video assets, for example. The video, that is, the indexed second content suggested by video-asset-matching module 207, may be based on analysis of the content being viewed by the user within the browser application 109 window. That is, the multimedia-analysis module 205 may analyze viewed content for keywords, metadata, etc., to determine the list of suggested content. The video-asset-matching module 207 may also access the user-profile database 215 to determine video content that was previously accessed by the user of the electronic device 105 and to provide these content items as the content suggestions 211 if appropriate. Otherwise, the video-asset-matching module 207 may search scene metadata from scene-metadata database 217 and video metadata from video-metadata database 221 to make the suggestions of video content to associate with the content being viewed by the browser application 109.

Therefore, in one example of operation, when a user accesses an article, for example, using the browser application 109, the multimedia-analysis module 205 analyzes the article for keywords or metadata and provides the information via connection 209 to the video-asset-matching module 207. The video-asset-matching module 207 may then access the various databases to determine a suitable match or set of matches related to the article being viewed and sends the content suggestions 211 to the browser application 109. The content suggestions 211 may also include suggestions for index positions within the content. For example, the video-asset-matching module 207 may search within the index positions for metadata or other information that matches metadata and or other information related to the article and make appropriate suggestions based on the results. The content suggestions may be handled by the user interface provided by server 101. Alternatively, the user interface may be resident on the electronic device. The user interface may appear as a second application window in some embodiments and may display the content suggestions 211 to the user of the electronic device 105. At that point, the user may make the determination of whether or not to make an association, that is, whether or not to pin the article to an index position such as a point in time, a frame, or a scene within a particular video asset.

Although the embodiments illustrated in FIGS. 1 and 2 are related to the browser application 109 and to the electronic device 105, a browser application is not necessary in all embodiments. For example, in one embodiment a user may access a video asset via a television set without the need for any particular software application. As discussed in detail above, the user may use a second electronic device, such as the electronic device 125, to access content related to the video. For example, user may use the electronic device 105, such as, but not limited to a smartphone, laptop, etc., to access an article. The electronic device 105 may form a connection with the server 101 via the Internet, and the server 101 may detect the article being accessed by the user. If the electronic device such as a television is an Internet-connected device, then the television may provide the user interface that enables the user to pin the article being viewed in the handheld device to the video displayed on the television. For this example, the user may have a user account, or be logged in, on the server 101, so that the server 101 has awareness of the devices that are tied to that specific user in order to be able to provide the associations between the various content types. Also, the user may be provided with a user interface on the electronic device that enables pinning of the displayed article to the video displayed on the television set. Various other possibilities may occur to those of ordinary skill in view of the descriptive examples provided above. Some specific embodiments using application windows such as, but not limited to, browser application windows are now described.

Figure 3:
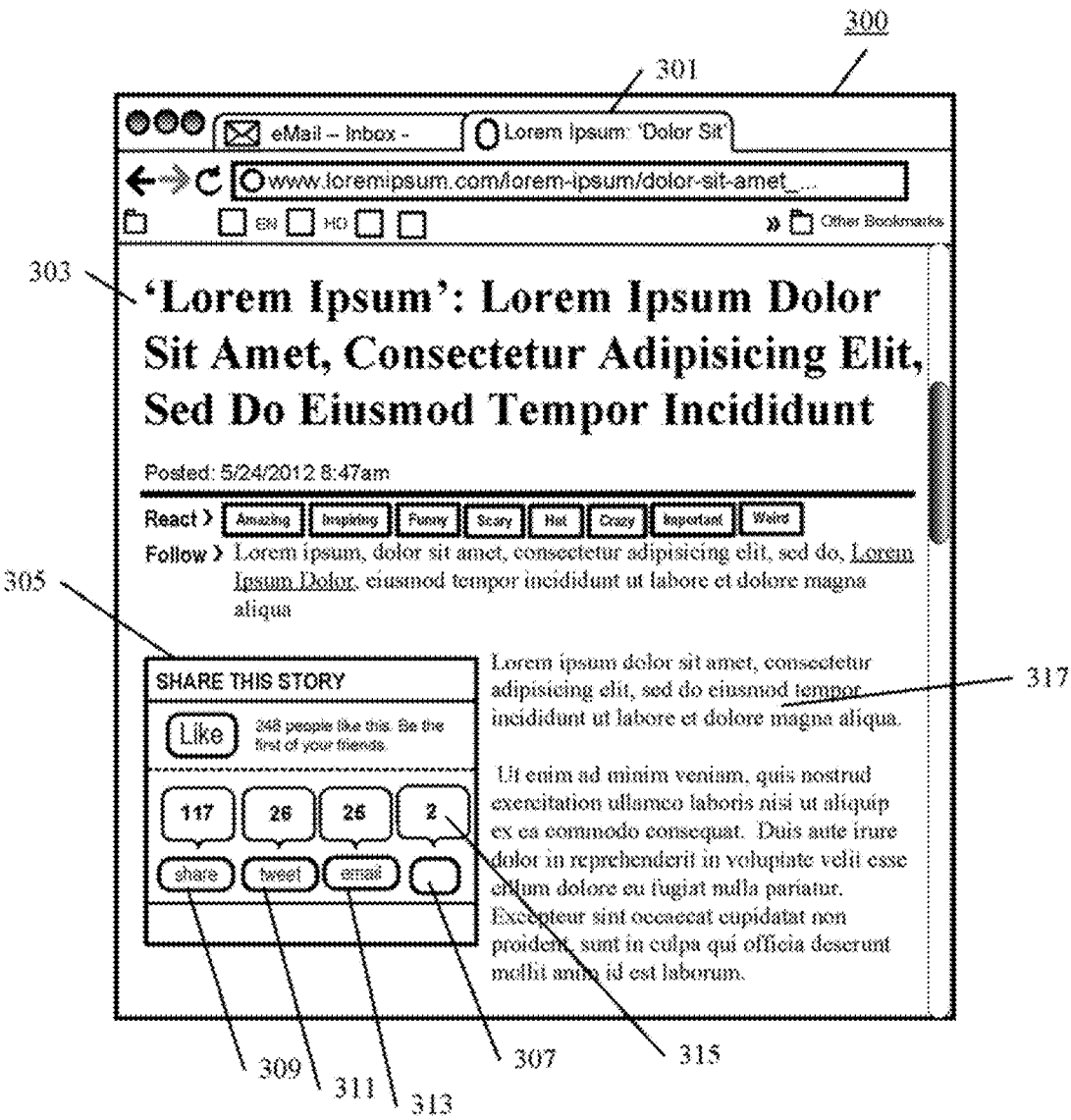
FIG. 3 is diagram showing an application window displaying a first content and having a selectable icon in accordance with one embodiment.

FIG. 3 is diagram showing an application window displaying a first content and having a first user interface, which is a selectable icon 307, in accordance with one embodiment. As shown in FIG. 3, the user may access an article 317, having a headline 303, via an application window 301. In the example embodiment illustrated by FIG. 3, the application window 301 is a tabbed window of a browser application 300. As understood by those of ordinary skill, articles such as article 317 may also have an associated user interface such as the "share this story" box 305. In the example box 305, various "buttons" are provided such as, for example, a "share" button 309, a "tweet" button 311, and an e-mail button 313. Each one of these buttons allows the user to perform the associated action such as e-mailing the article to another user via "pushing" the e-mail button 313, i.e., providing selection input at the e-mail button 313. In some cases, these buttons also have an associated "number of users" balloon 315 that indicates the number of users that have engaged in the activity related to the associated button. For example, as shown in the balloon above the share button 309, 117 users have "shared" the article 317. Likewise 26 users have "tweeted" the article 317, and 25 users have e-mailed the article 317.

In accordance with the embodiments, an additional "button" is provided that is, the pin button 307 which is a selectable icon and which is a first user interface. The pin button 307 allows initiation of pinning a piece of content to another indexed second content at an index position in accordance with the embodiments. That is, if the user decides to make an association of the article 317 to an indexed second content such as a video, the user may initially provide selection input at the pin button 307, which may provide an identification of the article 317 to the server 101. The identification may be, for example, the URL of the article, the headline 303, or metadata or some other suitable information that uniquely identifies the article 317 to the server 101 and enables later retrieval of the article 317.

Figure 4:
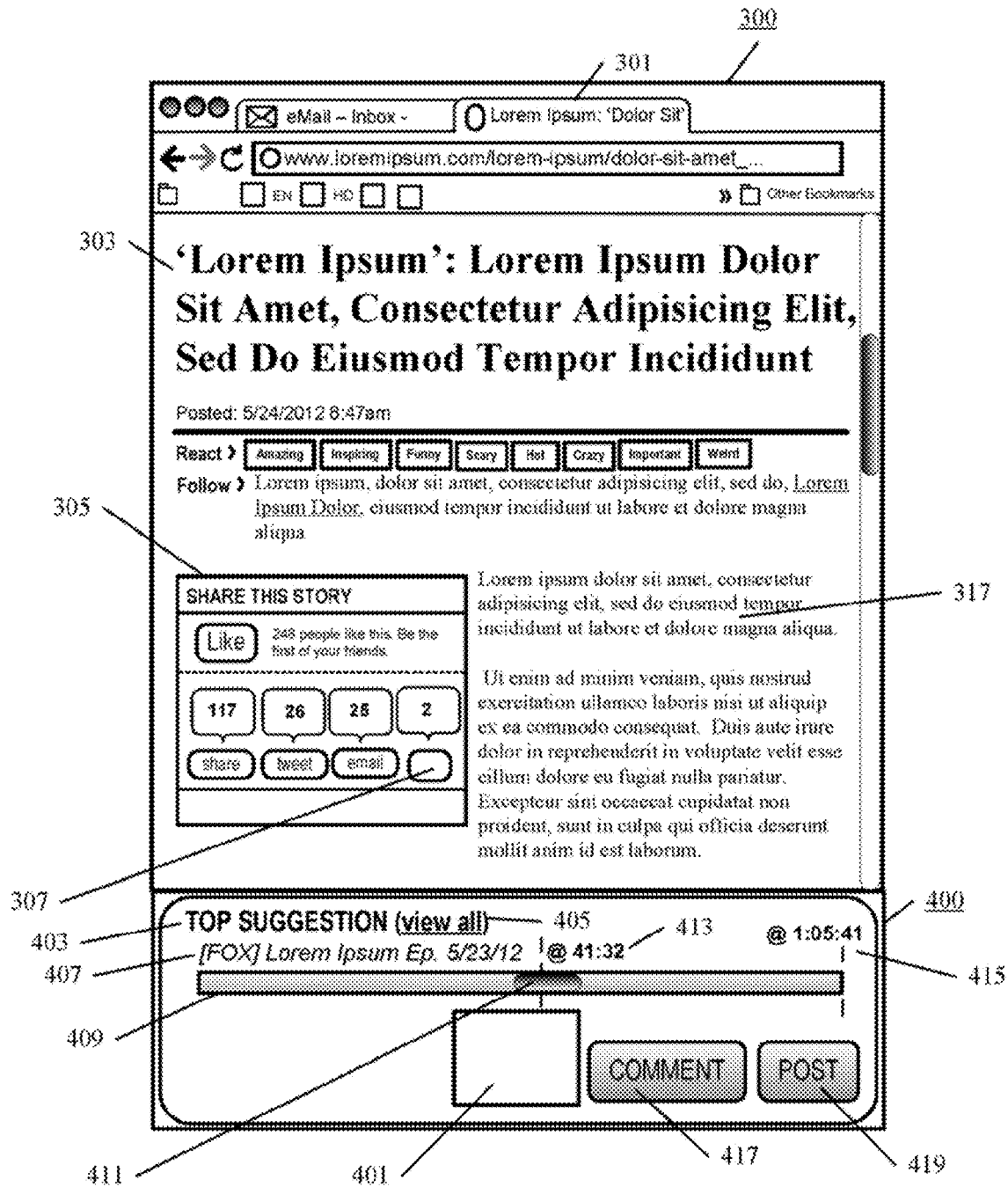
FIG. 4 is diagram showing an application window displaying a first content and having a second window displaying a suggested content for association in accordance with one embodiment.

Turning to FIG. 4, after selection of the pin button 307 by the user, a user interface 400 may appear and be displayed. In some embodiments, the browser application 300 may receive executable code, such as JavaScript or a Java applet, or some other suitable form of executable code, from the server 101 which when executed causes the processor of the electronic device 105 hosting the browser application 300 to display the user interface 400. In other embodiments, the user interface 400 may be integrated into the browser application 300 or may otherwise be resident on the electronic device 105. For the embodiments where a list of content suggestions is provided to the user by, for example, the content-suggestion server 201, the top suggestion 403 may be suggested initially to the user. The user interface 400 may also display a thumbnail view 401 of the video and an index scroll bar 409 having a position indicator 411 that indicates the time 413 within the video up to a maximum runtime 415 of the video. The title 407 of the video may also be displayed. If the user decides that the top suggestion 403 is not an appropriate selection for pinning the article 317, then the user may select a "view all" option 405 to view a list of the other suggested video-content assets. By selecting from the list, the user may be returned to the display shown by the user interface 400 with the selected video suggestion displayed as a thumbnail view 401. The user may move the position indicator 411 to the appropriate scene, frame, or time within the video and complete the pinning process by selecting the "post" button 419. Selecting the post button 419 sends the content-association input to the server 101 which proceeds to create the association in response to the inputs. The content-association input in this example includes at least the index-position information. The index position may be input in other ways in some embodiments, for example, direct entry into a text box or some other suitable input, such as, but not limited to, selecting a video frame, etc. The user may also be allowed to add comments by selecting the "comment" button 417 which will open an appropriate text box for user entry of comments. The content-association input will include at least the identification information for the indexed second content, which in this case example may be the title of the video, and an index position within the indexed second content. However, in embodiments where the server 101 or the content-suggestion server 201 provided a single suggestion the second content identification may be already known and need not be sent again. However, when the user has some choice as to what the second content will be, the content-association input may include identification of the second content as well as the index position. The content-association input may also include any comments added by the user. The index position as described above may be the time 413 of a specific scene within the video or an indication of the frame or scene by some other indexing scheme (such as frame number or scene number). That is, the index information provided to server 101 via user interface 400 depends on the indexing scheme applied to the video or other indexed content asset. The possible indexed second content is not limited to a video, but can be any indexed second content such as audio or a larger work such as a book that contains a number of pages and may be indexed by page number or another article that may be indexed by line numbers or paragraph numbers, etc. That is, the user may pin article 317 to a page number or paragraph number within a book or larger indexed piece of content. In other words, the indexed second content may be any type of content that is subject to an indexing scheme such as a time-indexing scheme, frame index, scene index, chapter index, page index, line numbers, paragraph numbers, or any other suitable indexing scheme.

Figure 5:
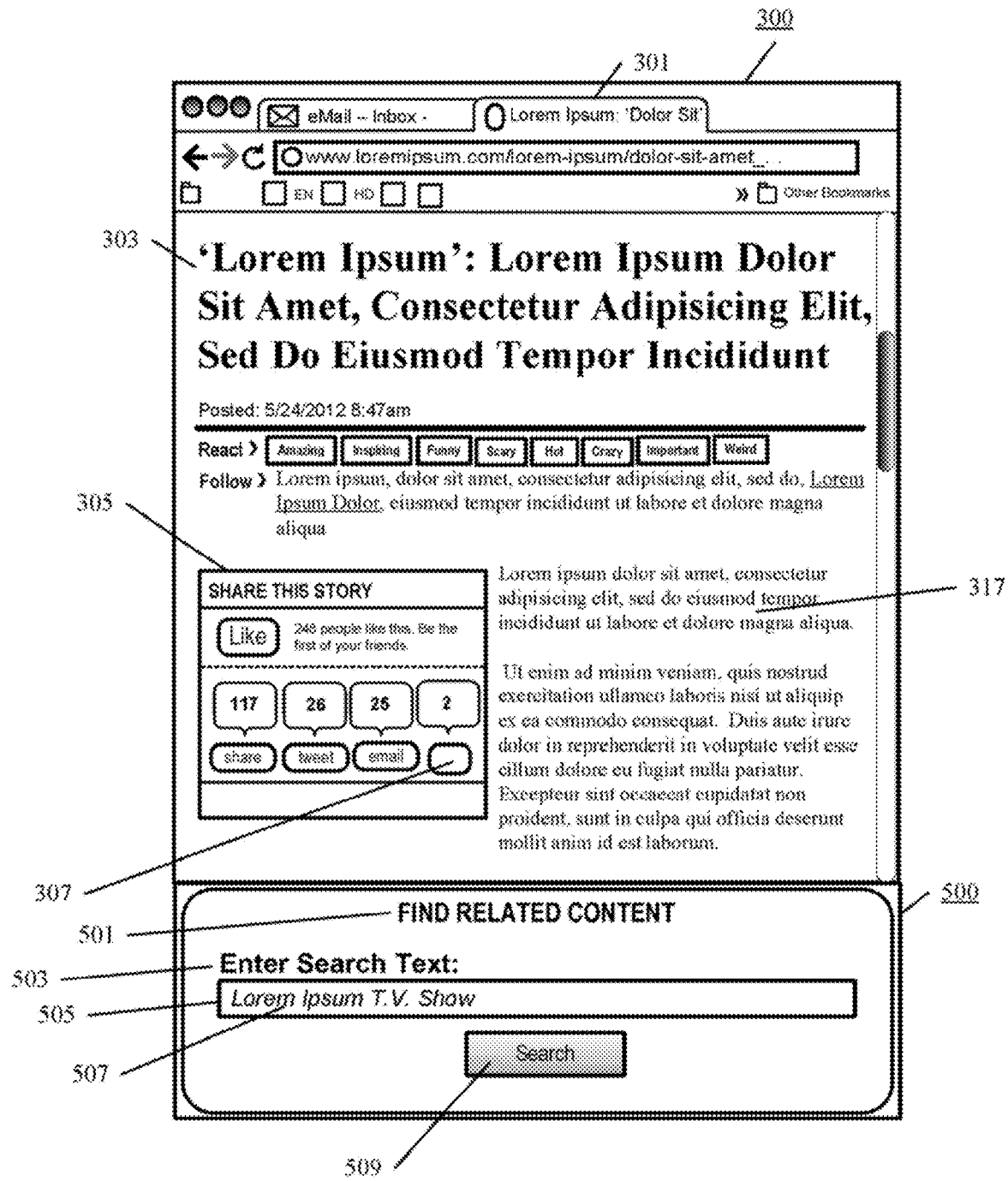
FIG. 5 is diagram showing an application window displaying a first content and having a second window for searching for a related content for association in accordance with one embodiment.

FIG. 5 is diagram showing the application window 301 displaying a first content and having a second window for searching for related content for association in accordance with one embodiment. The user interface 500 is an alternative to, or is preliminary to, the user interface 400 shown in FIG. 4, in that a search box 505 is provided along with an indication to "find related content" 501. That is, the user is prompted by an "Enter Search Text" prompt 503 and understands that the search box 505 may be used to search for the second indexed content. For example, the user may enter search text 507 that is related to the text of the article 317 or to the headline 303, or some other related information, and select the search button 509 to obtain search results. Thus in FIG. 5, the user may select the pin button 307 and obtain the user interface 500, where the user may then enter search text 507 into the search box 505 to perform a search for related indexed second content. The search will be directed to indexed second content, such as that found in the video catalog 119 illustrated in FIG. 1 or in the video-metadata database 221 illustrated in FIG. 2, etc.

When the user obtains the search results via user interface 500, the top suggestion of the search results may be provided to the user similar to the display illustrated by user interface 400 in FIG. 4. In other embodiments, the user may be immediately provided with the list of search results such that the user may select one of the specific results to be taken back to the user interface 400. The user may then work within the user interface 400 to select an index position within the second content and pin the article 317 to the specific index position. The thumbnail view 401 displays the scene or frame corresponding to the index position. Both user interfaces 400 and 500 send information back to the server 101 such that the server 101 may make associations and store the association in the pinned-content database 103. That is, the user interfaces described above allow the user to provide content-association input that is sent back to the server 101. The content-association input may include the second content identification information and an index position within the indexed second content to pin the first content. The content-association input may also include identification of the first content.

It is to be understood that in some embodiments, the user interfaces 400 or 500 may be displayed automatically without the need for the pin button 307. That is, the application window 301 may include the user interfaces 400 and 500 to allow pinning of indexed second content without displaying, or requiring selection of, the pin button 307. That is, any suitable user interface may be used such as, but not limited to, gesture input, gyroscopic control, hot buttons on a keyboard, voice activation, or any other suitable user interface.

Subsequently, when the same or another user accesses the indexed second content such as, for example, a video, and views the video up until the index position, the server 101 will provide information related to the pinned content. For example, the server 101 may provide either a link to the article 317 (such as an HTML link), a description of the article 317, the headline 303, a portion of the article 317, or the entire article 317, in response to access of the second content index position. In other words, when any user pins a first content to indexed second content, a subsequent access of the second content at the index position will result in the server 101 returning information about the pinned content such as either a link to the first content, a description of the first content, a portion of the first content, or the entire first content in response. "Access" as used herein may include viewing the second content, viewing identification information about the second content, or viewing metadata that provide other information about the second content. Further, viewing the second content about the index position may invoke the server 101 to provide information related to the pinned content. For example, the server 101 may provide information related to the pinned content before, after, specifically at, or during some plus/minus interval about the index position. These features may also be specified by the user in some embodiments.

In some embodiments, the recipients of such pinned content may be limited by a "friends" network such as in a social-media network. In this example, only friends in the social network will receive the pinned content that was pinned by one of their friends. The friends of the social network are recorded by server 101 and stored along with the content associations in the pinned-content database 103. That is, the server 101 may store permissions that enable certain users to view pinned content but not others. That is, a user may designate and provide permissions for certain users to view his pinned content but block others by setting various permissions.

Thus among other advantages of the various embodiments, a new type of informational association is provided in that a user may pin a first content to a second content at an index position, for later access by either the same user or by other users accessing the second content. The informational value of the indexed second content is therefore greatly enhanced because various indexed positions may have additional pinned content providing additional or supplemental information related to the indexed second content. Various other advantages of the embodiments may become apparent to those of ordinary skill in view of the descriptions provided herein.

Figure 6:
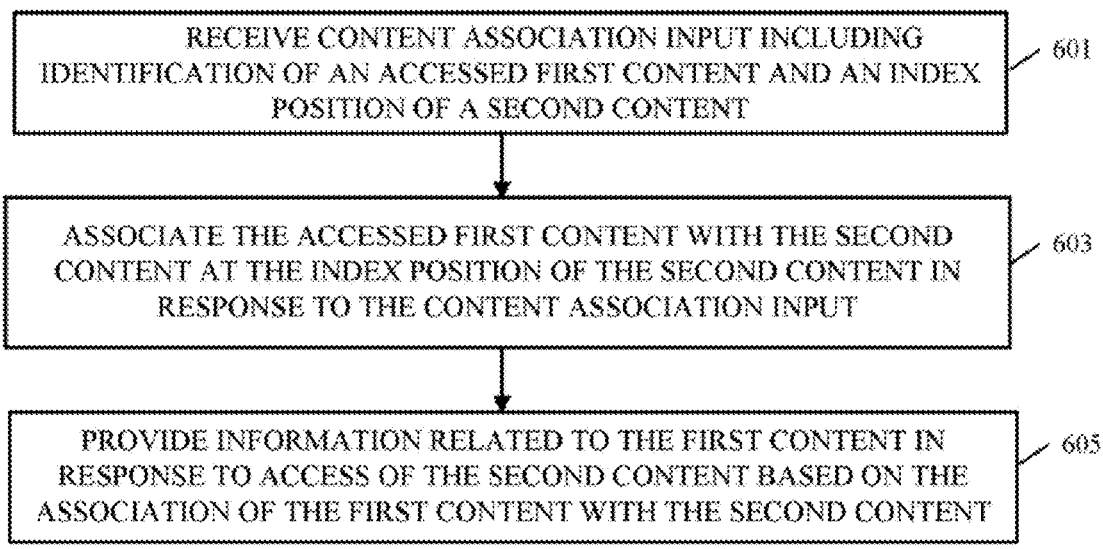
FIG. 6 is a flowchart illustrating a method of operation of the various embodiments.

FIG. 6 is a flowchart illustrating high-level operation of various embodiments. As shown in 601, the method of operation includes the server 101 receiving content-association input including identification of a first content and an index position of a second content. The identification of the first content may be a URL link, a title, metadata, or any other suitable identification that uniquely identifies the first content and enables retrieval of the first content by the server 101 or other devices. As shown in 603, the server 101 associates the first content with the second content at the index position in response to receiving the content-association input. In 605, the server 101 provides information related to the first content in response to access of the second content based on the association of the first content with the second content. Access as used herein may include viewing the second content, viewing identification information about the second content, or viewing metadata that provide other information about the second content.

As discussed in detail above, a user interface may be provided for receiving content-association input. The user interface may also display an indexed second content. The user may associate (i.e., pin) the first content with the second content at an index position of the second content. The server 101 stores the association information in response to the content-association input received via the user interface. In 605, the information that the server 101 provides may include a link to the first content, a description of the first content, a portion of the first content, or the entire first content, in response to access of the second content about the index position, based on the association of the first content with the second content. That is, the information is provided when the user access is near the index position, for example, during a time interval of the second content, at a specific time, or after or before a specific time or time interval.

Figure 7:
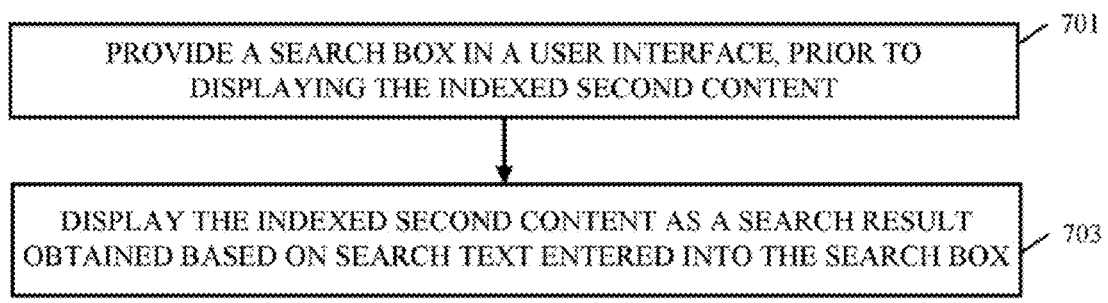
FIG. 7 is a flowchart of a method of operation of a user interface that provides a search box in accordance with an embodiment.

FIG. 7 is a flowchart for embodiments that provide a search box within the user interface. For example, in 701, a search box is provided in the user interface prior to displaying the indexed second content. In 703, the indexed second content is displayed as a search result obtained based on search text entered by the user into a search box. This operation is best understood with respect to FIG. 5 where the user interface 500 is shown having the search box 505. As described above, the user may enter the search text 507 into the search box 505 and hit the search button 509 to obtain search results accessible as the indexed second content. It is to be understood that the "find related content" user interface 500 only returns "indexed" content as the second content. In other words, another article would not be provided unless the article was somehow indexed and only if the index information could be indicated by the user interface such that the article 317 (i.e., the first content) could be pinned to the second content at an index position. The index position, as described above, can be a time index, a scene index, a frame index, a location index, or some other appropriate type of index that may be accessed through the user interfaces 400 or 500.

Figure 8:
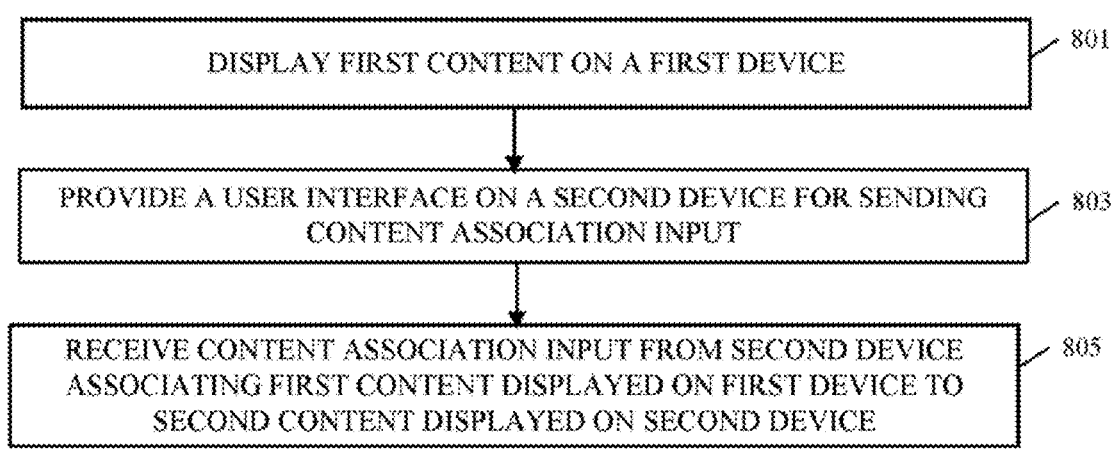
FIG. 8 is a flowchart of a method of operation of a first and second device, the first device displaying a first content and the second device having a user interface for associating a second content to the first content.

FIG. 8 is a flowchart for a method of operation where two electronic devices of a user are employed. That is, first content is displayed on a first device as shown in 801. In 803, a user interface is provided on a second device for sending content-association input. In 805, the server 101 may receive content-association input from the second device, associating (i.e., pinning) the first content displayed on the first device to second content displayed on the second device. The devices engage in context sharing that may be facilitated by the server 101 as described above.

Figure 9:
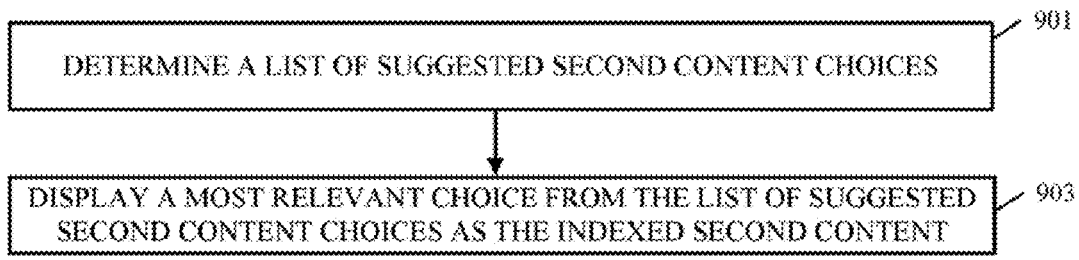
FIG. 9 is a flowchart of a method of operation of a user interface that provides a list of suggested content choices via a content-suggestion server in accordance with an embodiment.

FIG. 9 provides a flowchart related to the embodiment illustrated in FIG. 2 having a content-suggestion server 201. As shown in 901, the content-suggestion server 201 determines a list of suggested indexed second-content choices that may be displayed to the user in various ways. In 903, the user interface displays the most relevant choice from a list of suggested indexed second-content choices. However, in some embodiments as discussed above, the list of suggestions may be provided to the user with an option to select one from the list. In that case, the user interface would appear to the user similar to the user interface 400, where a video appears in the thumbnail view 401 and the index scroll bar 409 allows the user to move the position indicator 411 to an appropriate indexed position of the video before making the verification via the post button 419 to provide the content-association input to the server 101.

Figure 10:
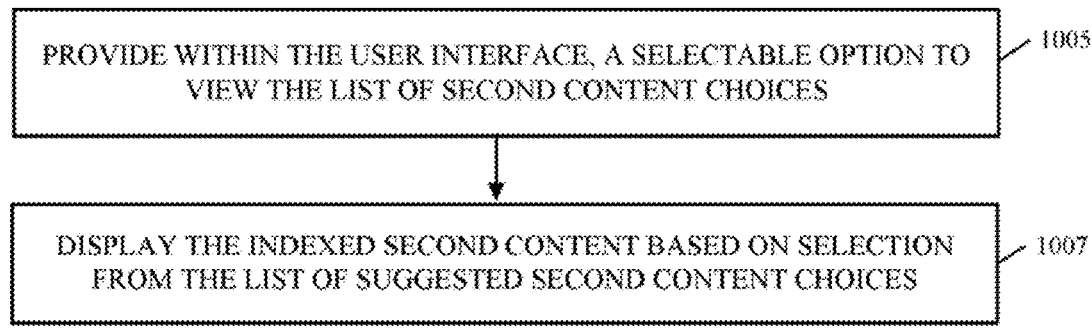
FIG. 10 is a flowchart of a method of operation for user interfaces that provide either a search box or a top suggestion of a list of suggested second-content choices, in accordance with various embodiments.

FIG. 10 illustrates the provision of a list of selectable choices for the indexed second content. For example in 1005, the user is provided within the user interface a selectable option to view the list of second-content choices. After the user makes a selection from the list, the user interface displays the indexed second content based on the selection as shown in 1007.

Figure 11:
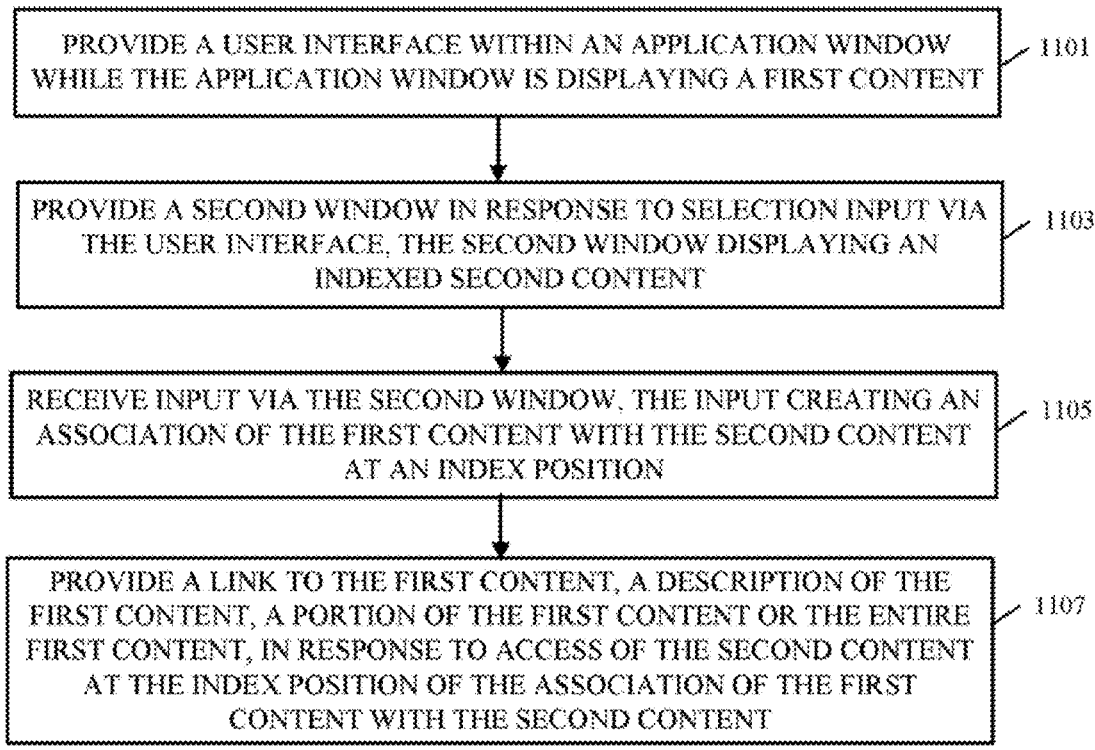
FIG. 11 is a flowchart of a method of operation in accordance with various embodiments that employ application windows to display the first and second content.

FIG. 11 is a flowchart showing operation of embodiments that employ the pin button 307. As discussed briefly above some embodiments automatically provide the user interfaces 400 or 500 and provide suggestions of indexed second content automatically. In that case, the user only needs to select the index position and use the post button 419 to make the content association. However in some embodiments, the user interface 400 and 500 are not displayed to the user unless the user has provided selection input at the pin button 307 which is a selectable icon. Thus in 1101, a selectable icon is provided within an application window while the application window is displaying a first content. That is, as the user is viewing an article 317, the pin button 307, which is a selectable icon in accordance with the embodiments, may be provided to the user. In 1103, a second window may be provided in response to selection input at the selectable icon (i.e., pushing the pin button 307). The second window displays the indexed second content. For example, in FIG. 4, if the user selects the pin button 307, then the user interface 400 appears to the user with the top suggestion 403, thereby enabling the user to verify the pinning operation by selecting an index position and hitting the post button 419. In 1105, the server 101 receives input via the second window and creates an association of the first content with the second content at the index position. In 1107, the server 101 provides a link to the first content, the description of the first content, a portion of the first content, or the entire first content, in response to the same or another user accessing the second content at the index position based on the association of the first content with the second content.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
    receiving, by a server, a content-association request from a first user, the content-association request including identification of an accessed first content;
    responsive to receiving the request, sending, by the server, a list of indexed second content choices to the first user, the list including one or more indexed second content related to the first content;
    receiving, by the server, a content-association input from the first user including identification of the first content and an index position of one of the one or more indexed second content from the list of indexed second content choices;
    responsive to receiving the content-association input, associating, by the server, the first content and the one of the one or more indexed second content at the index position of the indexed second content;

receiving, by the server, a request for the one of the one or more indexed second content from a second user; and providing information to the second user about the first content responsive to the second user viewing the index position of the one of the one or more indexed second content.

2. The method of claim 1 wherein providing information to the second user about the first content comprises:

providing to the second user at least one of a link to the first content, a description of the first content, and a portion of the first content.

3. The method of claim 1, wherein the list of indexed second content choices is determined according to a search result obtained based on search text entered into a search box.

4. The method of claim 1 further comprising:

determining, automatically, the list of indexed second content choices.

5. The method of claim 1 further comprising:

providing, within a user interface, a selectable option to view the list of indexed second content choices.

6. The method of claim 1 further comprising:

determining the list of indexed second content choices based on accessed content indicated in a user history of the first user.

7. The method of claim 1 further comprising:

providing a user interface on a first device while the first content is displayed on a second device, the user interface operative to send the content-association input.

8. The method of claim 1 wherein the one of the one or more indexed second content includes video content, the video content having one of a time index or a frame index where an index position of the one of the one or more indexed second content corresponds to a time in the video or a frame in the video content.

9. A system comprising:

at least one server hosting an application accessible by a plurality of users, the at least one server operative to:

receive a content-association request from a first of the plurality of users, the content-association request including identification of a first content;

send to the first user, responsive to receiving the request, a list of indexed second content choices, the list including one or more second content related to the first content;

receive, from the first user, a content-association input from the first user including identification of the first content and an index position of one of the one or more indexed second content from the list of indexed second content choices;

associate the first content and the one of the one or more indexed second content at the index position of the indexed second content; and provide to a second user of the plurality of users information related to the first content, in response to access of the one of the one or more indexed second content at the index position by the second user.

10. The system of claim 9 wherein the at least one server is further operative to:

receive index-position input via a user interface on a remote device.

11. The system of claim 9 further comprising:

a content-suggestion server, operatively coupled to the at least one server, the content-suggestion server operative to determine the one or more second content.

12. The system of claim 11 wherein the content-suggestion server is further operative to:

determine a most relevant choice for inclusion in the list of indexed second content choices as one of the one or more second content.

13. The system of claim 12 further comprising:

a user-profile database operatively coupled to the content-suggestion server;

wherein the content-suggestion server is further operative to determine the list of indexed second content choices based on accessed content indicated in a user history of the first user stored in the user-profile database.

14. The system of claim 13 wherein the content-suggestion server comprises:

a multimedia-analysis module operative to analyze the first content being displayed to the first user on a remote device; and a video-asset-matching module operatively coupled to the multimedia-analysis module, the video-asset-matching module operative to receive analysis of the first content, access video metadata of the one or more second content, scene metadata of the one or more second content, and a user profile and to provide the remote device with at least one suggested second content of the one or more second content.

* * * * *